United States Patent [19]
Saey

[11] Patent Number: 5,875,772
[45] Date of Patent: Mar. 2, 1999

[54] BARBECUE APPARATUS

[75] Inventor: Stephane Saey, Kortrijk, Belgium

[73] Assignee: Saey N.V., Kortrijk/Heule, Belgium

[21] Appl. No.: 916,918

[22] Filed: Aug. 18, 1997

[30] Foreign Application Priority Data

Aug. 22, 1996 [BE] Belgium ................................. 09600716

[51] Int. Cl.⁶ .................................................. A47J 37/00
[52] U.S. Cl. ...................................... 126/25 R; 126/25 B
[58] Field of Search ................................ 126/25 R, 25 A, 126/25 B, 9 R, 30, 9 B, 25 C

[56] References Cited

U.S. PATENT DOCUMENTS

| | | | |
|---|---|---|---|
| 3,209,743 | 10/1965 | Stewart et al. | |
| 3,841,299 | 10/1974 | Tomita. | |
| 3,915,145 | 10/1975 | Tomita | 126/25 A |
| 4,281,633 | 8/1981 | Wackerman | 126/25 R |
| 4,603,679 | 8/1986 | Ogden | 126/25 B |
| 5,086,752 | 2/1992 | Hait | 126/25 R |
| 5,154,159 | 10/1992 | Knafelc et al. | 126/25 B |

FOREIGN PATENT DOCUMENTS 0 186 929  7/1986  European Pat. Off. .

*Primary Examiner*—James C. Yeung
*Attorney, Agent, or Firm*—Maria Parrish Tungol; John A. Parrish

[57] ABSTRACT

The invention barbecue apparatus with an air-permeable holder for ignition material for fuel in the fireplace to be suspended in a tubular stand of the barbecue apparatus. A reservoir for liquid fire extinguishing material and/or for collecting ashes can be provided in the tubular stand, whereby the reservoir with fire extinguishing material contributes to a lowering of the center of gravity of the apparatus. A removable support grating for solid fuel can be provided in the fireplace. The barbecue apparatus can include a cover so that in case of unexpected falling, the barbecue apparatus tips over in the direction of the cover and the solid fuel lands in the cover.

9 Claims, 2 Drawing Sheets

BARBECUE APPARATUS

FIELD OF THE INVENTION

The invention relates to barbecue apparatuses, more particularly to barbecue apparatuses which employ solid fuel.

BACKGROUND OF THE INVENTION

Barbecue apparatuses which employ solid fuel are generally known. These barbecue apparatuses are especially suited for private use, are often portable and comprise a fireplace for solid fuel such as for example charcoal, briquettes, and the like. One of the problems with those types of barbecues is ignition of the solid fuel. Various solutions have been put forward for that purpose, including ignition fluids have proven very dangerous with a second attempt at lighting, electrical devices (which often prove to be either too costly or function insufficiently), fire-lighters for use in the fireplace with petroleum derivatives or the like (which give off an unpleasant smell and/or provide an insufficient homogeneous ignition) and finally, ignition devices below the fireplace. As to this latter approach, a number of developments are known.

U.S. Pat. Nos. 3,209,743 and 3,841,299 and Belgian patent 901.452 describe ignition provisions which are mounted under the fireplace and use available materials such as newspaper for ignition.

The barbecue device according to Belgian patent 901.452 comprises a fireplace for solid fuel, a tubular stand having a draught opening that connects to the fireplace and an ignition device in the tubular stand whereby paper can be inserted into the ignition device and lit via the draught opening. Although such a barbecue solves certain problems of the barbecue apparatuses known in the past, there are nevertheless still disadvantages. Thus, insertion of the paper and lighting it is not easy and stability and safety are not optimal.

The object of this invention is to provide a barbecue device which avoids these disadvantages and improves the stability and safety in use.

SUMMARY OF THE INVENTION

For the above purpose, the barbecue apparatus according to the invention employs a device which comprises a fireplace for solid fuel. Connected to the fireplace is a tubular stand that includes a draught opening. An ignition device is included in the tubular stand for igniting the solid fuel placed in the fireplace. The ignition device includes an air-permeable holder suspended in the tubular stand for receiving the ignition material for the solid fuel.

In a further aspect of the invention, a reservoir can be provided in the tubular stand for liquid fire extinguishing material such as water.

In a specific embodiment of this aspect of the invention, the air-permeable holder can be provided underneath with a reservoir for liquid fire extinguishing material and/or for collecting ashes.

The reservoir with the fire extinguishing material is preferably provided in the tubular stand that it contributes to lowering of the center of gravity of the barbecue apparatus.

In yet another additional aspect of the invention, a removable support grating for solid fuel can be provided in the fireplace. This removable support grating is preferably provided with griping points such as handles so that the grating can easily be removed and filled with solid fuel such as charcoal. Thus, if lighting of the solid fuel is not entirely successful, the lighting procedure can easily be repeated, without the need to empty the charcoal fuel.

In preferred embodiment of the invention, the fireplace can be provided with a closing cover, so that due to the relative centers of gravity of the fireplace with stand and the closing cover due to the relative positions of the points of suspension on the cover and on the fire place, and due to the shape of the fireplace and/or of the cover, then in an unexpected fall of the barbecue apparatus in the direction of the cover, then the solid fuel from the fireplace lands primarily in the cover. The cover, moreover, when in its open position functions as an additional wind-break for the fireplace of the barbecue.

In yet another aspect of the invention, the fireplace can be provided with suspension points so that the gridirons for supporting the food to be grilled can be mounted at more than one height in the fireplace.

In a specific embodiment of the invention, the ignition device employs an air-permeable holder for the ignition material. The air-permeable holder is preferably a perforated cylinder that fits into the tubular stand. Preferably, the tubular stand and the perforated tubular air permeable holder of the ignition device are both of corresponding tubular form.

BRIEF DESCRIPTION OF THE DRAWINGS

Further distinctive features and characteristics of the invention will be clarified in the following description of a specific embodiment of the invention as represented in the attached drawings. It should be noted that the embodiment shown in the drawings is only by way of example and implies no restriction on the scope of the invention.

In the attached drawings.

DETAILED DESCRIPTION OF THE INVENTION

Figure 1:
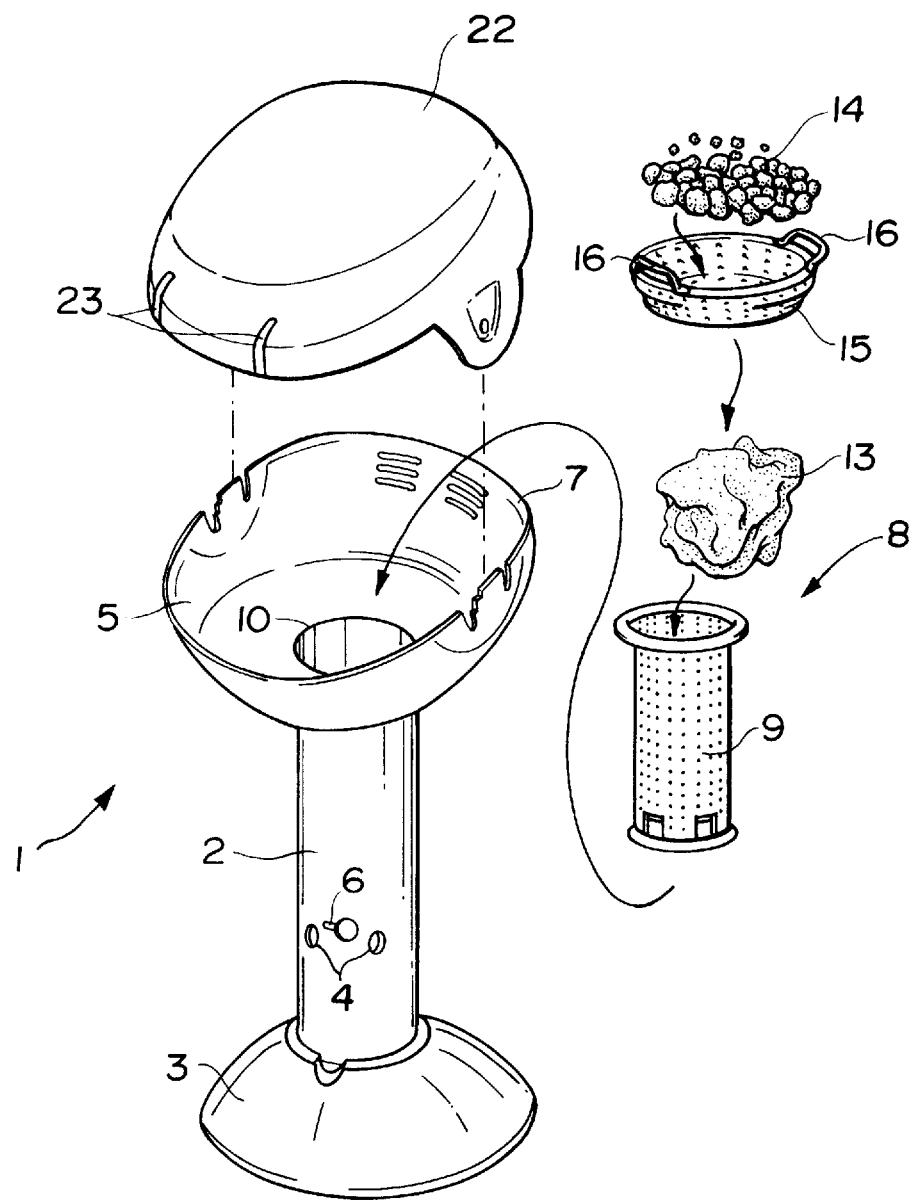
FIG. 1 is an exploded view in perspective of the barbecue apparatus according to the invention.

In the figures, the barbecue apparatus (1) includes a tubular stand (2) in the form of a cylindrical tube with hollow foot (3).

Hollow foot (3) is point symmetric figure of revolution and designed so that stability is ensured; hollow foot is hollow underneath in order to be stable in the presence of small unevennesses. Hollow foot (3) is joined to tubular stand (2) by providing a small depression having screw holes on the inside (underside) (3) and which also is provided with drainage holes, which serve as access to the attachment elements.

Tubular stand (2) is spot-welded and provided with two air supply holes (4) if a fall were to occur, water would not run through the (opened) air supply holes 4. Tubular stand (2) also is provided with holes for connection to hollow foot 3 and pan (5) of the fireplace. Air supply holes (4) can be regulated by handle (6) operated slide (not shown).

A water reservoir is provided in tubular stand (2). The water reservoir can take the form of a glass or plastic pot in tubular stand (2). An elongated opening (punch-out) may be included in the tubular stand as a gauge glass (outer diameter=inner diameter of the pole). The weight of the water reservoir improves the stability of the barbecue apparatus and extinguishes/cools the solid fuel charcoal coals were the barbecue apparatus fell. In the event of a fall, a pool of water forms on the ground around pan (5), through which ignition of dry grass is avoided. The capacity of the reservoir is preferably at least two litres in order to obtain an acceptable effect.

Figures 2, 3:
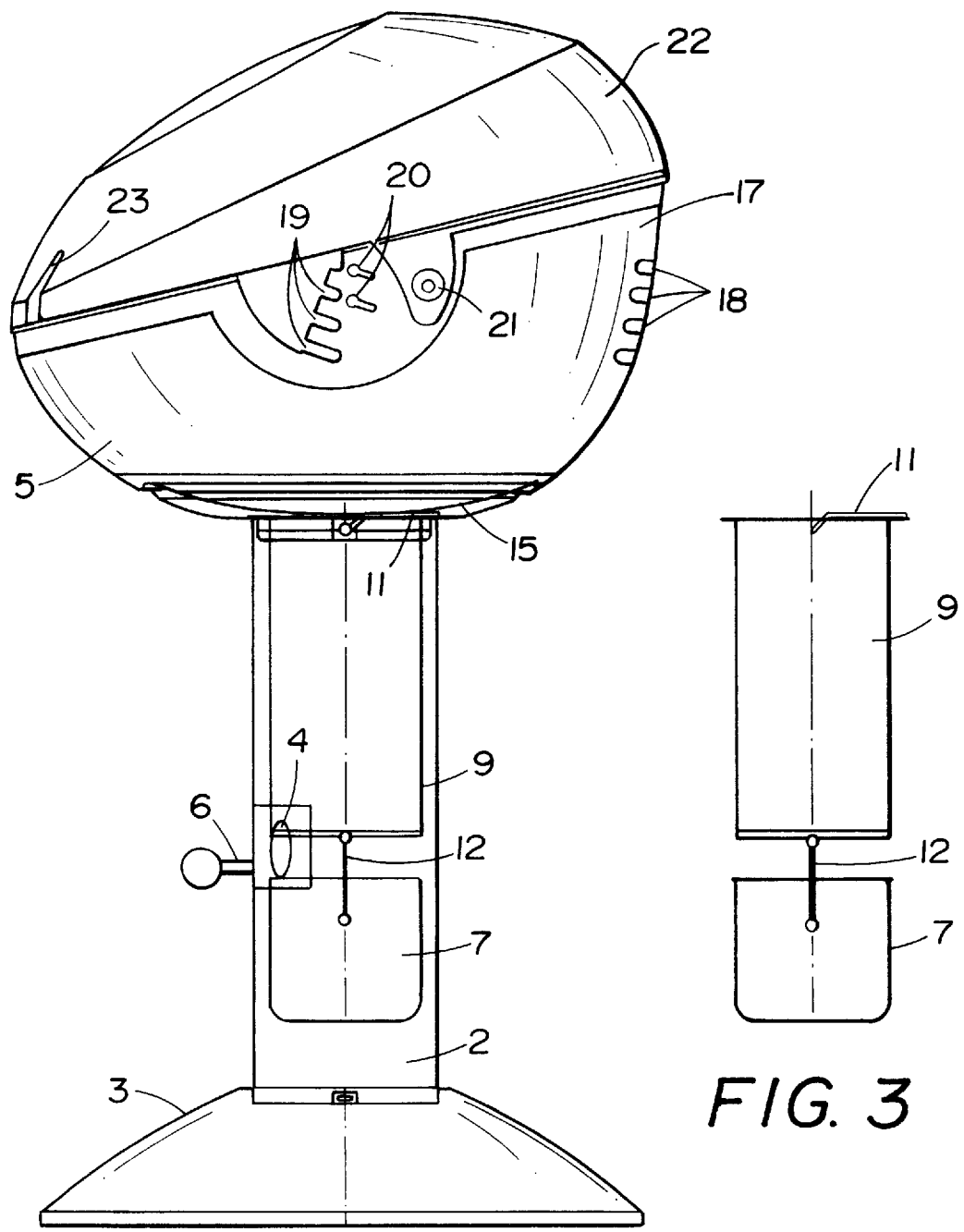
FIG. 2 is a cross-section of a different embodiment of the barbecue apparatus shown in FIG. 1.
FIG. 3 is an enlarged detail representation of the ignition device and the fire extinguisher reservoir of the barbecue apparatus according to FIG. 2.

The water reservoir can also be formed by ashpan (7), below the ignition device which is indicated in its entirety by the reference number (8), as shown in FIG. 1. The ignition device (8)—the so-called "Quick-start" mechanism—includes a perforated stainless steel cylinder (9) suspended in tubular stand (2) that rests on shoulder (10) of pan (5). The perforated cylinder (9) functions as basket for the ignition medium, namely two sheets of newspaper (13). As shown in FIGS. 2 and 3, cylinder (9) can also be provided with a handle (11) on top—see in particular FIG. 3—(stainless steel handle (11), locked in one of the holes in perforated cylinder (9) by spring force) and with a second stainless steel handle (12) below which on serves as suspension of ashpan(7), and as an end stop for the ignition zone (the two sheets of newspaper cannot be pushed farther down). Perforated cylinder (9) promotes the complete burning of the newspaper through a more efficient flow of air from the air inlet to the burning newspaper through the perforations over the whole length of cylinder (9) (i.e. for the entire mass of newspaper, and not only at the bottom). Because of this, burning of the newspaper occurs considerably more cleanly and achieves a predictable progress, irrespective of the weather conditions. A possibly unburned piece of newspaper at the bottom can therefore not influence further burning. This design of the ignition system promotes the ignition of the solid fuel coals through a guaranteed supply of fresh air in the concentric zone. Choking the passage of air to the coals with pieces of newspaper is prevented because of this. Furthermore the chimney effect is clearly increased and occurs from burning of the first pieces of newspaper. The temperature of the tubular stand(2) during ignition remains significantly lower with the ignition system, through which the tubular stand is better protected against the effects of high lo temperatures and through which the loss of energy because of heat emission of the tubular shaft to the environment decreases. Because of this the efficiency of the system is increased. The ignition system further provides a controlled burning of the newspaper, both with calm weather and windy surroundings.

The support grating (15) formed of perforated steel for the solid fuel (charcoal, briquettes, etc.) (14) is made of steel, enameled steel or stainless steel, and is perforated and wok-shaped. A wire-shaped handle with two grips (16) on the outer edge of grating (15) is clamped between rolled over edges of the perforated steel of grating (15).

Because of the shape and the size of grating (15) there is an optimum flow of air under a large amount of coals, through which the initial ignition of the coals occurs quicker. Through the shape and the distance to the pan the temperature of the pan under the central point of the fire remains lower.

The pan—fireplace—(5) is produced with an integrated wind-break (17) at the back provided with air vents (18), and provided with adjustment points (19) for the gridiron(s)—not shown—, with points of suspension (20) for a spit—also not shown—and with connection points (21) for the cover (22).

The cover (22) is opened by rotating backwards round two connection points on the side. In open position, cover (22) serves as extra wind-break. It can be closed in order to achieve an oven function and/or in case of severe wind conditions. The cover (22) can also catch the coals were the barbecue to fall over. Slots (23) are furthermore provided in the cover (22) in order that the gridiron may be moved in height with the cover closed, by means of handles that extend out of the grilling compartment.

By experience it has been determined that with this barbecue apparatus according to the invention significantly lower temperatures were measured than with usual barbecue apparatuses, both on the surface of the pan (5) and on the surface of the stand (2), and this owing to the concept of the new ignition system (8) and the new base grating (15) according to the invention.

The new base grating (15) provides a distance between the hot coals and the pan. Because of this the temperature zone is lowered at the most critical point of the pan (5). The new ignition system provides a controlled rise in temperature of the tubular stand during the ignition phase.

I claim:

1. Barbecue apparatus comprising in combination, a fireplace, a tubular stand connected to the fireplace, said tubular stand having at least one draught opening, said fireplace having a removable support grating for receiving solid fuel, said fireplace located outside said tubular stand, said tubular stand adapted to receive an ignition device comprising a removable air-permeable holder for ignition material for igniting the solid fuel, said air-permeable holder having means for suspending said holder in said tubular stand.

2. Barbecue apparatus according to claim 1, further comprising a reservoir in the tubular stand for liquid fire extinguishing material.

3. Barbecue apparatus according to claim 2, wherein the reservoir is positioned in the tubular stand to cause lowering of the center of gravity of the apparatus.

4. Barbecue apparatus comprising in combination, a fireplace, a tubular stand connected to the fireplace, said tubular stand having at least one draught opening, said fireplace having a removable support grating for receiving solid fuel, said fireplace located outside said tubular stand, said tubular stand adapted to receive an ignition device comprising a removable air-permeable holder for ignition material for igniting the solid fuel, said air-permeable holder having means for suspending said holder in said tubular stand, wherein the ignition device includes an air-permeable holder that includes a reservoir for liquid fire extinguishing material.

5. Barbecue apparatus according to claim 4, wherein the reservoir is positioned in the tubular stand to cause lowering of the center of gravity of the apparatus.

6. Barbecue apparatus comprising in combination, a fireplace, a tubular stand connected to the fireplace, said tubular stand having at least one draught opening, said fireplace having a removable support grating for receiving solid fuel, said fireplace located outside said tubular stand, said tubular stand adapted to receive an ignition device comprising a removable air-permeable holder for ignition material for igniting the solid fuel, said air-permeable holder having means for suspending said holder in said tubular stand, wherein the support grating is provided with gripping points so that the grating can be removed and replaced with the charcoal.

7. Barbecue apparatus comprising in combination, a fireplace, a tubular stand connected to the fireplace, said tubular stand having at least one draught opening, said fireplace having a removable support grating for receiving solid fuel, said fireplace located outside said tubular stand, said tubular stand adapted to receive an ignition device comprising a removable air-permeable holder for ignition material for igniting the solid fuel, said air-permeable holder having means for suspending said holder in said tubular stand, wherein the fireplace includes a closing cover for receiving solid fuel from the fireplace during a fall of the barbecue apparatus in the direction of the cover.

8. Barbecue apparatus comprising in combination, a fireplace, a tubular stand connected to the fireplace, said tubular stand having at least one draught opening, said fireplace having a removable support grating for receiving solid fuel, said fireplace located outside said tubular stand, said tubular stand adapted to receive an ignition device comprising a removable air-permeable holder for ignition material for igniting the solid fuel, said air-permeable holder having means for suspending said holder in said tubular stand, wherein said air-permeable holder for ignition material includes a perforated cylinder that fits into the tubular stand.

9. Barbecue apparatus comprising in combination, a fireplace, a tubular stand connected to the fireplace, said tubular stand having at least one draught opening, said fireplace having a removable support grating for receiving solid fuel, said fireplace located outside said tubular stand, said tubular stand adapted to receive an ignition device comprising a removable air-permeable holder for ignition material for igniting the solid fuel, said air-permeable holder having means for suspending said holder in said tubular stand, the ignition device comprising the air-permeable holder provided underneath with a reservoir for liquid fire extinguishing material, the reservoir positioned in the tubular stand to cause lowering of the center of gravity of the apparatus, wherein the support grating is provided with gripping points so that the grating can be removed and replaced with the solid fuel, the fireplace having a closing cover for receiving the solid fuel from the fireplace during a fall of the barbecue apparatus in the direction of the cover, said air-permeable holder for ignition material including a perforated cylinder that fits into the tubular stand.

* * * * *